Patented July 10, 1945

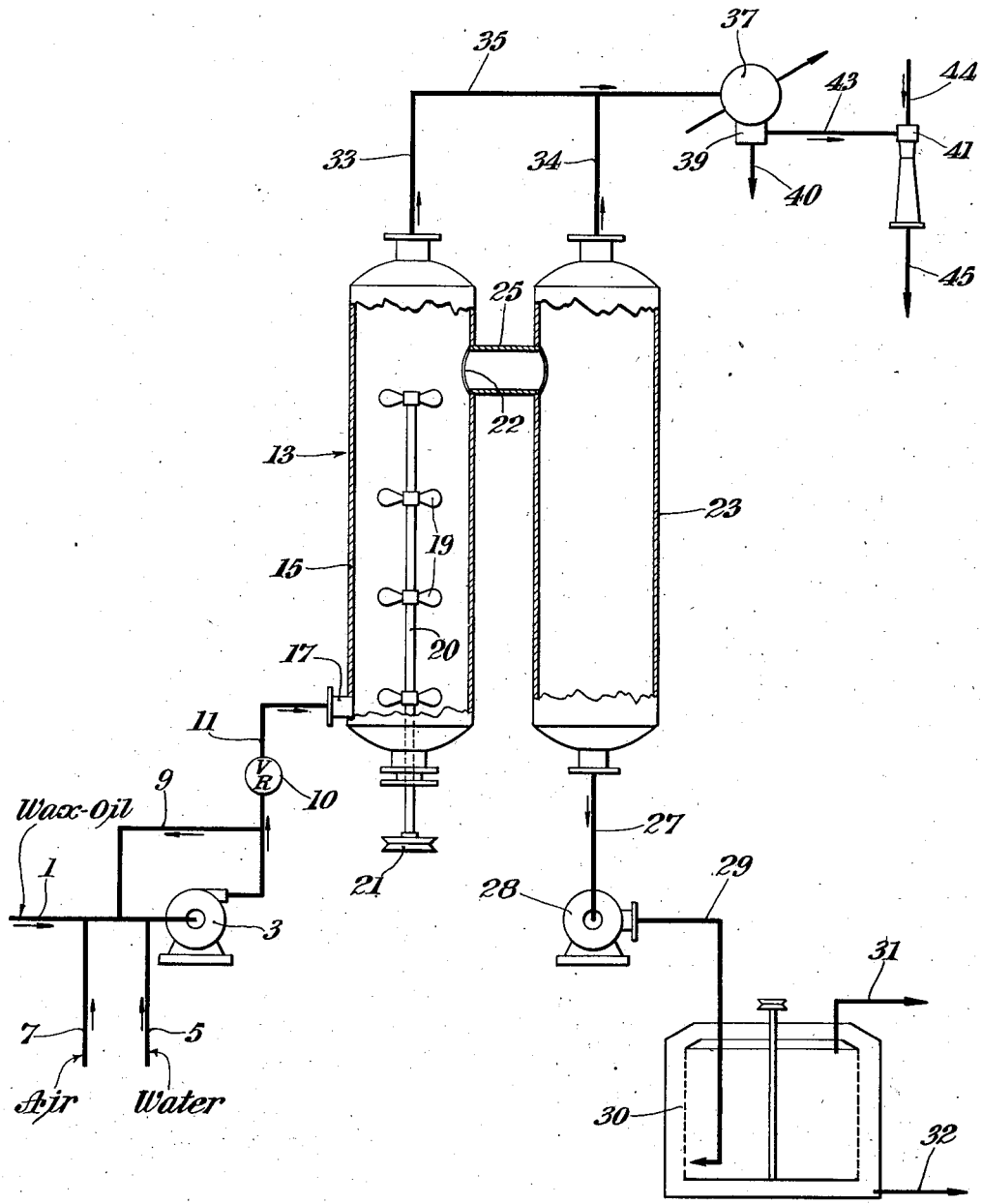

2,380,077

UNITED STATES PATENT OFFICE 2,380,077

WAX-OIL SEPARATION

August Henry Schutte, Hastings on Hudson, N. Y.

Application August 1, 1942, Serial No. 453,219

8 Claims. (Cl. 196—18)

This invention relates to the separation of wax-oil mixtures and more particularly to an improved method of and an apparatus for preparing an emulsion or dispersion of a wax-oil mixture and an immiscible fluid for separation of the wax from the oil.

In the emulsion process of separating wax from oil as disclosed in my prior patents, Nos. 2,168,140, 2,168,141, 2,168,142, 2,168,143, and 2,168,306, issued August 1, 1939, a wax-oil mixture such as a slack wax or a wax-bearing oil, while in the liquid state, is emulsified or agitated with an immiscible fluid, and the resulting emulsion or dispersion is cooled to solidify the portion of the wax desired to be separated. In the commercial operation of this process, it has been found that water and air, used together, are most satisfactory for forming an emulsion or dispersion having the desired characteristics. The cooled, partially solidified dispersion or mixture is then passed to a centrifugal separator such as a filter, wherein the solidified wax is separated from the remaining liquid.

In the operation of my process as generally practiced heretofore, the wax-oil emulsion is conveniently formed by passing the wax-oil mixture, the water, and the air through a rotary pump or other suitable emulsifying or agitating device of a similar nature. The emulsion is circulated through the pump a sufficient number of times so that it has the desired ultimate consistency. During such circulation the emulsion is cooled to effect the desired solidification by the direct addition thereto of sufficient cooling water. This procedure results in shock chilling of the emulsion.

Although this procedure is generally satisfactory for the deoiling of slack wax and other relatively low oil content stocks, it has been found that shock chilling is not suitable for the treatment of all types of wax-oil mixtures. In particular, those mixtures which contain a relatively high percentage of oil (above approximately 30%) or which contain petrolatum or amorphous wax (above about ½%) or in which a substantial amount of subcooling is required are not amenable to satisfactory treatment by this process. With such a stock, shock chilling results in the formation of a partially solidified emulsion, from which the solidified wax can not be effectively separated in a centrifugal filter or the like. The precise reason for this result is not known, but it appears that the shock chilling procedure is the primary cause.

If, however, with such an oil stock, a gradual chilling of the wax-oil emulsion is carried out, I find that a readily filterable mixture is obtained and that I can effect the desired separation. With control of the rate of cooling, a better control of the wax crystal nuclei formation and growth and, thus, of the final solidified wax structure is obtained. The improved crystalline structure, which this gradual cooling or chilling procedure provides, results in a better and much more effective separation of the solidified wax from the oil in a centrifugal filter.

I have now found that, by reason of the subjection of the wax-oil emulsion to a reduction in pressure, I can effect the desired cooling in a gradual manner by vaporization of the nonsolvent liquid and I can control the rate of cooling so as to obtain a readily separable partially solidified wax-oil-water-air dispersion. At the same time, an improved porous structure of the partially solidified emulsion or dispersion is obtained whereby the separation of the remaining liquid from the solidified wax is facilitated. This improved porous structure appears to result from the expansion which the wax undergoes as it is solidified and subjected to the reduction in pressure. The immediate effect of this expansion is that the air in a unit volume of solidified wax comprises a greater percentage thereof.

The principal object of my present invention is to provide an improved procedure for cooling the emulsion formed in my emulsion separation process whereby a more gradual chilling of the emulsion is provided.

A further object of my invention is to control the cooling of the emulsion so that an improved porous structure of the solidified emulsion results whereby centrifugal separation of the emulsion may be more readily and effectively accomplished.

A still further object of my invention is to provide a method of gradually cooling the emulsion wherein the cooling is effected by vaporization of the nonsolvent liquid by a reduction in the pressure maintained on the emulsion.

Another object of my invention is to effect an expansion of the porous solidified wax structure during cooling thereof whereby the separation of the oil from the wax is facilitated.

Still another object of my invention is to provide an improved emulsion separation of a wax-oil mixture having a relatively high oil content or containing petrolatum or amorphous wax.

Further objects and advantages of my invention will be apparent from the following description thereof taken in connection with the accompanying drawing, which illustrates apparatus suitable for carrying out my invention.

In a preferred manner of carrying out my invention, the wax-oil mixture to be separated is introduced into the system through the line 1. This mixture, which is maintained at a temperature such that it is in liquid condition, is passed to a suitable emulsifying or agitating device 3 such as a rotary pump, a homogenizer, or the like, wherein it is emulsified with a nonsolvent liquid and a nonsolvent gas to form the desired emulsion. As explained in my prior patents, the liquid and the gas should also be inert or non-reactive with respect to the wax-oil mixture, and I have found that water and air, which are desirable because of their cheapness and ready availability, are entirely satisfactory for this purpose. The water necessary for the formation of the emulsion may be conveniently introduced through line 5. The air which is utilized in the formation of the emulsion is desirably introduced through line 7. In order to insure that the desired degree of emulsification or agitation is attained, the greater portion of the emulsion or dispersion discharged from emulsifying device 3 is recirculated therethrough by means of line 9.

According to my invention, the resulting emulsion or dispersion is discharged through relief valve 10 and is then introduced through line 11 into the cooling system generally indicated at 13. In a preferred form of embodiment of my invention, this system includes a vertical cooling tower 15, into the lower part of which the emulsion is introduced as through nozzle 17. During its residence within the cooling tower 15, the wax-oil emulsion is subjected to a reduction in pressure which effects the vaporization of a portion of the water contained in the emulsion. The heat of vaporization of the water is derived from the heat content of the mass of emulsion undergoing cooling, and the emulsion can be thus cooled to the desired separating temperature.

The emulsified mixture of wax, oil, water, and air is preferably introduced into cooling tower 15 in a liquid condition before any solidification of the wax takes place. By avoiding any such premature chilling, I can eliminate the deleterious effects of shock chilling on the wax solidification. Accordingly, the water introduced through line 5 must be at approximately the molten wax-oil temperature so that substantially no cooling of the resulting emulsion occurs before introduction thereof into cooling tower 15. Furthermore, since the emulsion is desirably formed under a superatmospheric pressure, relief valve 10 is preferably so positioned in transfer line 11 that the resulting reduction in pressure exerts the minimum cooling effect on the emulsion or dispersion while passing through line 11.

Cooling tower 15 is so arranged that the emulsion is compelled to move upwardly therethrough. In this manner a continuous operation is obtained, and the cooling effect due to the vaporization of the water gradually increases as the top of the tower is approached; this effect results from the increase in absolute pressure as the bottom of the tower, when filled with emulsion, is approached. Accordingly, a gradual cooling of the emulsion is accomplished, and the adverse effects of shock chilling are substantially avoided. Optimum results are obtained, particularly in deoiling operations, when the temperature gradient is least in the zone of initial cooling or chilling; in other words, the initial rate of cooling of the emulsion is desirably the most gradual.

Agitating blades or paddles 19, mounted on shaft 20, are desirably provided not only to subject the emulsion to continued agitation but also to assist the upward movement of the emulsion through tower 15. The resulting agitation of the emulsion tends to maintain the temperature thereof at any particular transverse plane substantially the same. This effect may be aided by providing a plurality of spaced baffles (not shown) along shaft 20 if it is desirable or necessary to do so. Power may be transmitted to shaft 20 for rotation thereof through pulley 21 from a suitable motor (not shown).

The amount of cooling effected in tower 15 may be suitably controlled either by varying the rate of flow of the emulsion through the tower or by varying the size of this tower. In either case, the cooled, partially solidified emulsion may be discharged from tower 15 at 22 for separation in any suitable manner. Alternatively, however, I may provide a second cooling tower 23, which may be connected to tower 15 by means of conduit 25, to permit a greater residence time of the emulsion within the cooling system in order to effect the desired cooling. This additional tower also conveniently provides the necessary volumetric capacity to handle the emulsion, which undergoes a several-fold (approximately five to seven times) expansion in volume upon subjection to the reduction in pressure. The emulsion, cooled to the desired degree, is removed from tower 23 through line 27 by means of pump 28, which discharges the emulsion through line 29 into a centrifugal separator such as filter 30 for the separation of the solidified wax from the remaining liquid material. It will be appreciated that towers 15 and 23 are both suitably insulated so that the desired cooling conditions therein can be maintained. The porous wax filter cake, after remelting, is removed from filter 30 through line 31; and the oil-water filtrate is removed through line 32.

The water vaporized by reason of the reduction in pressure is removed from cooling towers 15 and 23 through lines 33 and 34, respectively. These lines are connected to a manifold 35, which conducts the water vapors to the condenser 37, the condensate from which is collected in accumulator 39. The condensed water is removed from the system through line 40. It is to be noted that, where water is vaporized to produce the necessary cooling, a pressure below atmospheric is desirably maintained in the cooling system. Accordingly, a suitable vacuum-creating mechanism 41 is attached to condenser 37 as by means of line 43, through which the uncondensable gases flow. For this purpose I have shown a jet ejector, through which water or steam may be passed as by means of lines 44 and 45. It will be understood that a vacuum pump or the like may also be used for this purpose.

In the formation of the emulsion, sufficient additional water to provide the necessary cooling effect within the cooling system 13 is supplied through line 5 along with the water necessary for the formation of the emulsion. As already noted, this water desirably has a temperature substantially the same as that of the incoming wax-oil mixture so that no premature cooling of the emulsion occurs in the emulsifying device 3. The water necessary for the formation of the emulsion can not be vaporized to provide the desired cooling since a minimum amount of water is required in order to accomplish an effective separation of the oil from the partially solidified wax-oil emulsion during filtration thereof.

By means of my improved procedure, a greater control over the cooling of the wax-oil emulsion is provided. It will be seen that the vaporization of the water primarily takes place from the upper surface of the emulsion in the cooling tower and that the effect of the vacuum is gradually reduced as the bottom of this tower is approached because of the increase in pressure which occurs. In this manner a gradual vaporization of the water takes place during the passage of the emulsion upwardly through cooling tower 15. Accordingly, a gradual cooling of the wax-oil emulsion is accomplished in contradistinction to the shock chilling obtained according to prior practice.

A further effect of the subjection of the emulsion to the vacuum is that an improved porous structure of the resulting solidified wax is obtained. This improved structure results from the expansion which the emulsion undergoes when it is subjected to the vacuum. The air which forms part of the emulsion expands upon the reduction in pressure that takes place when the emulsion is introduced into cooling tower 15. The structure of the partially solidified emulsion is not disrupted by the expansion of the air, however, and the apparent effect of the reduction in pressure is an increase in the space occupied by the air in a unit volume of emulsion. The ultimate result of such effect is that the oil can be more easily separated from the solidified wax in the subsequent centrifugal filtering operation.

My improved procedure is applicable to the separation of substantially any type of wax-oil mixture containing crystalline wax and may also be used in the separation of a mixture of waxes into desired wax fractions. It may be desirably applied to the deoiling of a slack wax with improved operation, but it is particularly applicable to the processing of paraffin distillates, petrolatum-containing stocks, and other high oil content stocks.

A typical stock which can be satisfactorily dewaxed by means of my improved process comprises a Tupengato (Argentine) wax-containing gas oil having a melting point of 82° F. The gas oil stock is heated to a temperature of approximately 90° F. to convert it to a liquid condition and is then emulsified with water and air. The resulting emulsion is introduced into the cooling zone at a temperature of approximately 90° F. and is removed therefrom at a temperature of approximately 45° F., at which temperature the chilled emulsion is charged to the centrifugal filter for the desired separation. In this connection, it is to be noted that, at 90° F., water has a vapor pressure of approximately 1.42 inches Hg and a latent heat of vaporization of approximately 1,042 B. t. u. per pound and that, at 45° F., the vapor pressure of water is approximately 0.30 inch Hg and its latent heat of vaporization is approximately 1,068 B. t. u. per pound.

It will be appreciated that, although I have described my invention in connection with the use of a vacuum to effect the desired vaporization of the nonsolvent liquid, any suitable reduction in pressure such as a reduction of a superatmospheric pressure to a lower pressure either above, at, or below atmospheric or a reduction of atmospheric pressure to a subatmospheric pressure may be used. The particular reduction utilized will be governed by the volatility of the particular nonsolvent employed.

Although water constitutes a suitable nonsolvent liquid for this separation, in some cases it may be desirable to use a more volatile nonsolvent liquid such as methyl alcohol, ethyl alcohol, or the like. In place of air, other inert, nonsolvent gases such as carbon dioxide and nitrogen may be used. It may be desirable, where readily liquefiable inert gases are employed, to form the emulsion under sufficient pressure so that the inert gas is maintained in a liquid condition. In such case, upon the requisite reduction in pressure, the gas is vaporized; and not only is an expanded, porous, solidified wax structure obtained, but an additional cooling effect due to the vaporization of the liquefied inert gas is also provided. Furthermore, it may be desirable to employ only a liquefied inert gas as the nonsolvent fluid in the formation of the emulsion; in such case sufficient liquefied gas must be used so that enough inert liquid is left after vaporization to effect the removal of the oil to be separated.

If desired, the wax, oil, water, and air may be introduced into the cooling system as a simple mixture. In such case, the necessary preliminary emulsification takes place in the lower part of cooling tower 15, wherein the desired agitation is provided by means of the agitating blades 19.

It will be appreciated that the application of my invention is not necessarily limited to the separation of an oil-wax mixture. It may also be advantageously applied to the separation of other types of mixtures which are amenable to separation by my emulsion process. In this connection, attention is called to my prior copending applications, Serial Number 274,412, filed May 18, 1939, Serial Number 411,646, filed September 20, 1941, Serial Number 411,647, filed September 20, 1941, and Serial Number 411,648, filed September 20, 1941, wherein my emulsion process is applied to the separation of a mixture of at least two organic compounds or a solution of an organic compound in an inorganic liquid such as water, which compounds have different melting points. The said applications have matured into the following patents: Nos. 2,296,456, 2,296,457, 2,296,458 and 2,296,459. All of these patents issued September 22, 1942. Each patent deals with the separation of a mixture of organic compounds by emulsification thereof with a non-solvent liquid and in inert gas, cooling of the emulsion to precipitate the lowest melting point compound of the mixture and subjection of the cooled emulsion to a liquid-solid separating operation. Patent No. 2,296,456 deals with separation of an oil-wax mixture and also deals with the separation of a mixture containing alpha naphthol and beta naphthol. Patent No. 2,296,457 deals with the separation of a mixture of materials selected from the group consisting of higher saturated and unsaturated aliphatic fatty acids and their glycerides. Patent No. 2,296,458 deals with the separation of an aqueous solution of at least one of the lower fatty acids. Patent No. 2,296,459 deals with the separation of a mixture of at least two aromatic compounds.

Although I have described a preferred form of embodiment of my invention, I am aware that modifications may be made thereto; therefore, only such limitations as appear in the claims appended hereinafter should be applied.

I claim:

1. The method of separating a mixture of at least two organic compounds having different melting points into predetermined fractions, which comprises maintaining the mixture in a liquid condition, forming an emulsion thereof with an inert, nonsolvent gas and a nonreactive, nonsolvent liquid, said liquid having a boiling point considerably below those of the organic compounds, cooling the resulting emulsion by subjecting it to a reduction in the pressure maintained thereon to vaporize at least a part of the nonsolvent liquid sufficient to solidify at least one of the predetermined fractions, violently mechanically agitating the emulsion during such cooling to maintain the emulsified condition, and thereafter making a liquid-solid separation of the emulsion to separate the solidified material from the remaining liquid material.

2. An apparatus for gradually cooling an emulsion of a wax-oil mixture with water and air, which comprises a vertical cooling tower, means to introduce the wax-oil mixture in liquid condition admixed with the water and air into the lower portion of the tower, agitating means within said tower to emulsify such mixture, means to apply a vacuum to the top of the tower to subject the resulting emulsion thereto in order to gradually vaporize a portion of the water sufficient to gradually partially cool the emulsion and to gradually partially solidify the wax desired to be separated, means to remove the vaporized water from the top of the tower, means to pass the partially cooled emulsion from the upper portion of the tower to the upper portion of a second cooling tower, means to apply a vacuum to the top of the second tower to subject the partially cooled emulsion continuously to a vacuum to gradually vaporize sufficient water to completely solidify the desired wax fraction, means to remove the vaporized water from the top of this tower, and means to remove the cooled, partially solidified emulsion from the lower portion of this tower.

3. The method of separating a wax-oil mixture, which comprises maintaining the mixture in a liquid condition, forming an emulsion thereof with an inert, nonsolvent gas and a nonreactive, nonsolvent liquid, said liquid having a boiling range substantially lower than that of the oil, passing the resulting emulsion through an elongated zone, slowly cooling the emulsion during its passage through such zone by subjecting it to a gradual reduction in the pressure maintained thereon to gradually vaporize at least a part of the nonsolvent liquid sufficient to solidify the desired wax fraction, said reduction in pressure causing the gas to expand and thereby to produce a highly porous wax structure, violently mechanically agitating the emulsion during said reduction in pressure to maintain the emulsified condition, and thereafter separating the solidified wax from the remaining liquid material.

4. The method of separating a wax-oil mixture, which comprises maintaining the mixture in a liquid condition, forming an emulsion thereof with a liquefied inert, nonsolvent gas and a nonreactive, nonsolvent liquid, said gas having a boiling range substantially lower than that of the oil and the liquid, maintaining the pressure on said emulsion during its emulsification sufficient to retain the nonsolvent gas in liquefied condition, passing the resulting emulsion through an elongated zone, slowly cooling the emulsion during its passage through such zone by subjecting it to a gradual reduction in the pressure maintained thereon to gradually vaporize at least a part of the nonsolvent liquefied gas sufficient to solidify the desired wax fraction, said reduction in pressure causing the vaporized gas to expand and thereby to produce a highly porous wax structure, violently mechanically agitating the emulsion during said reduction in pressure to maintain the emulsified condition, and thereafter separating the solidified wax from the remaining liquid material.

5. The method of separating a wax-oil mixture, which comprises maintaining the mixture in a liquid condition, forming an emulsion thereof with a liquefied inert, nonsolvent gas, said gas having a boiling range substantially lower than that of the oil, maintaining the pressure on said emulsion during its emulsification sufficient to retain the nonsolvent gas in liquefied condition, passing the resulting emulsion through an elongated zone, slowly cooling the emulsion during its passage through such zone by subjecting it to a gradual reduction in the pressure maintained thereon to gradually vaporize at least a part of the nonsolvent liquefied gas sufficient to solidify the desired wax fraction, said reduction in pressure causing the vaporized gas to expand and thereby to produce a highly porous wax structure, violently mechanically agitating the emulsion during said reduction in pressure to maintain the emulsified condition, and thereafter separating the solidified wax from the remaining liquid material.

6. The method of separating a wax-oil mixture, which comprises admixing such mixture, while in liquid condition, with an inert, nonsolvent gas and a nonreactive, nonsolvent liquid, said liquid having a boiling range substantially lower than that of the oil, passing the resulting admixture through an elongated zone, subjecting the admixture in said zone to violent mechanical agitation to emulsify the same, simultaneously slowly cooling the emulsion during its passage through such zone by subjecting it to a gradual reduction in the pressure maintained thereon to gradually vaporize at least a part of the nonsolvent liquid sufficient to solidify the desired wax fraction, said reduction in pressure causing the gas to expand and thereby to produce a highly porous wax structure, and thereafter separating the solidified wax from the remaining liquid material.

7. The method of separating a wax-oil mixture, which comprises forming an emulsion of such mixture, while in a liquid state, with an inert nonsolvent fluid in a liquid state and having a boiling range substantially lower than that of the oil, passing the emulsion through a cooling zone and subjecting it to violent mechanical agitation in such passage, subjecting the emulsion during such passage to gradual reduction in pressure to effect gradual vaporization of at least a part of such nonsolvent fluid and thereby gradually cool the emulsion to solidify the desired wax fraction and render said fraction highly porous by vapor expansion consequent to said pressure reduction, and thereafter separating the solidified wax from the remaining liquid material.

8. Apparatus for gradually cooling an emulsion of a wax-oil mixture with a nonreactive nonsolvent fluid in liquid condition, comprising a cooling tower, means to continuously introduce the wax-oil mixture in liquid condition and admixed with said fluid into the lower portion of said tower, rotary agitating means mounted for operation within said tower to emulsify the mixture introduced, a second cooling tower, a delivery connection between the upper portion of the first tower and the upper portion of the second tower to pass the mixture to the latter, condenser means, conduit connections between the upper portions of said towers and said condenser means, ejector means in suction connection with the condenser means, to reduce the pressure in said towers, for vaporization of said fluid and consequent gradual cooling of the mixture as the latter is passed through the towers in succession, to solidify wax in the mixture, and means to pass the cooled mixture from the lower portion of the second tower.

AUGUST HENRY SCHUTTE.